Figure 1:
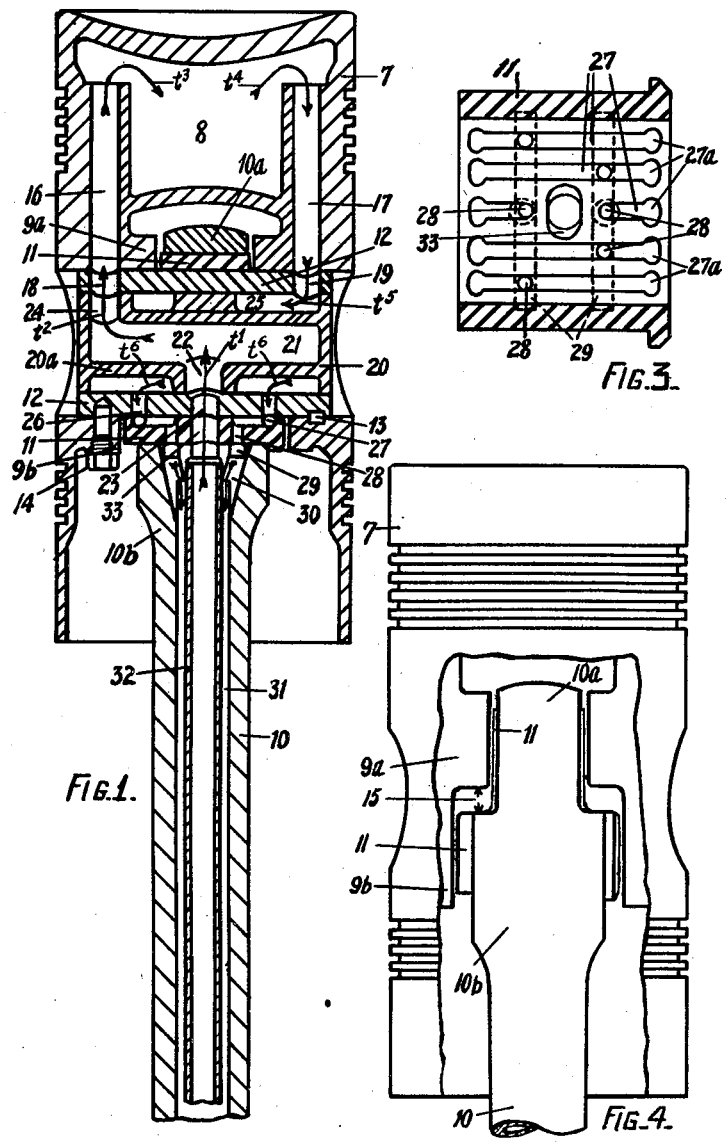

March 12, 1940. H. H. BLACHE ET AL 2,193,684
LUBRICATING AND COOLING SYSTEM FOR BEARINGS AND PISTONS
Filed Aug. 9, 1938 3 Sheets-Sheet 1

H. H. Blache &
F. E. Rebbeck
Inventors
By Glascock Downing & Seabold
Attys.

March 12, 1940.  H. H. BLACHE ET AL  2,193,684
LUBRICATING AND COOLING SYSTEM FOR BEARINGS AND PISTONS
Filed Aug. 9, 1938  3 Sheets-Sheet 3

H. H. Blache &
F. E. Rebbeck
Inventors
By Bascock Downing & Seebold
Attys.

Patented Mar. 12, 1940

2,193,684

UNITED STATES PATENT OFFICE 2,193,684

LUBRICATING AND COOLING SYSTEM FOR BEARINGS AND PISTONS

Hans Henrik Blache and Frederick Ernest Rebbeck, Belfast, Ireland

Application August 9, 1938, Serial No. 223,954
In Great Britain August 14, 1937

5 Claims. (Cl. 123—176)

This invention relates to single-acting internal combustion engines having oil-cooled pistons articulated by means of cylindrical gudgeon-pins to the connecting rods, and the invention has for its object to provide improved means for lubricating the gudgeon-pin bearings and for cooling the gudgeon-pin and piston.

It is known to divide the oil supply from an oil pump into a dual-flow stream, one stream cooling the pistons and the other stream lubricating the gudgeon-pin bearings. It is also known to supply lubricating oil through the connecting rod to the gudgeon-pin bearings and to return the oil therefrom into the crank-case chamber through another passage in the connecting rod, while oil for cooling the piston is supplied through the connecting rod and gudgeon-pin to a cooling space in the piston, from whence it is discharged into the crankcase chamber through telescopic pipes or other means arranged to establish a liquid passage between the moving piston and the crankcase chamber independently of the connecting rod.

The present invention has for its object to avoid dual-flow or divided flow systems without the use of telescopic pipes or any other means of establishing an oil passage from the piston to the crankcase chamber independently of the connecting rod. Thus is attained an engine simpler in design and cheaper to build, in which also all moving parts in the crankcase chamber are more easily overhauled and maintained.

According to the present invention, in an internal combustion engine having an oil-cooled single-acting piston articulated by means of a cylindrical gudgeon-pin to a connecting rod, the whole of the stream of oil used for cooling the piston also passes through the gudgeon-pin and through lubrication grooves between the gudgeon-pin and its bearing bush in the passage of the oil as a continuous and single uniflow current which is supplied to a supply passage in the connecting rod and returns to a return passage in the connecting rod. Consequently, the whole of the stream of oil used for cooling the piston is not only used to cool the gudgeon-pin, but is also utilised to build up a continuously flowing film of oil between the gudgeon-pin and its bearing bush and this continuously flowing film of oil serves both to lubricate and to carry away heat from the bearing faces of the gudgeon-pin and its bearing bush.

The whole of the oil passes in sequence first through the gudgeon-pin, then through a cooling chamber in the piston and finally through lubricating grooves between the gudgeon-pin and its bearing bush, in the flow of the oil from and to the connecting rod, but this sequence may be varied so long as the whole of the oil stream used for cooling the piston also passes through the hollow gudgeon and through the lubricating grooves between the gudgeon-pin and its bearing bush. As both the supply and return of the whole quantity of oil required for cooling the piston and for cooling and lubricating the gudgeon-pin and its bearing bush takes place through connecting rod, we avoid the use of any oil piping connecting the moving piston to the crankcase chamber independently of the connecting rod, and we avoid dividing the oil stream into one stream for cooling the piston and another stream or streams for lubricating the gudgeon-pin bearing faces.

The invention is applicable more particularly, but is not restricted wholly, to engines in which the hollow gudgeon-pin is fixed in bosses on the piston or a crosshead and is fitted in a bearing bush which is fixed in the eye of the connecting rod.

Figure 2:
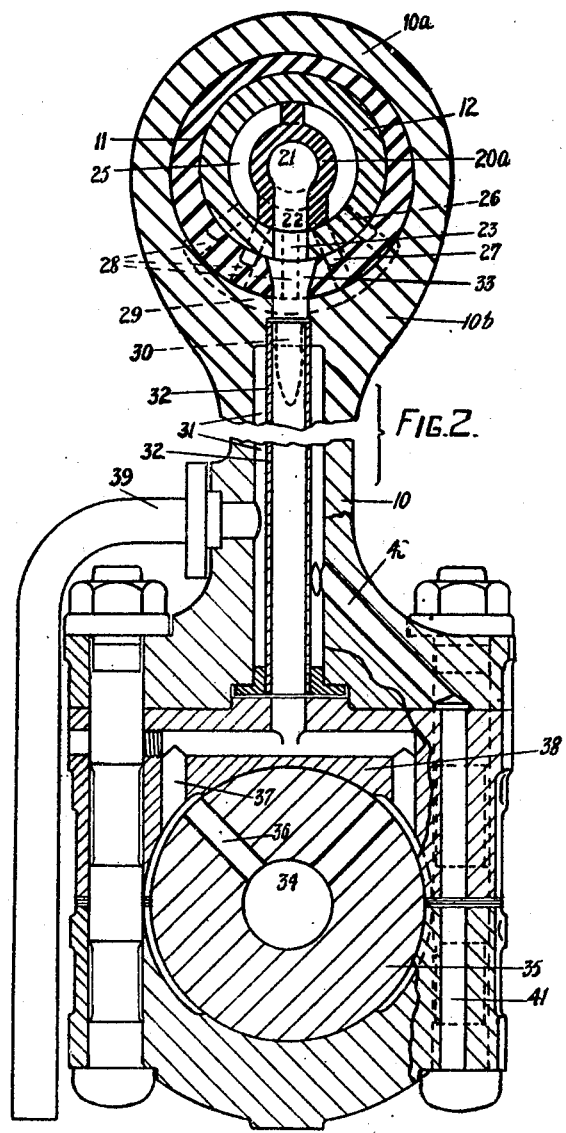

The accompanying drawings illustrate the preferred manner of carrying out the invention. On the drawings, Fig. 1 shows a longitudinal vertical section through a trunk piston and the upper end of the connecting rod articulated thereto. Fig. 2 is a vertical sectional view at right angles to the sectional plane of Fig. 1 showing the connecting rod with its bottom or big-end bearing and top or small-end bearing, the piston being omitted. Fig. 3 is a horizontal sectional view looking on the lower part of the top-end bush. Fig. 4 is a side view of the piston and upper end of the connecting rod with the piston partly broken away to show the connecting rod top end.

Figure 5:
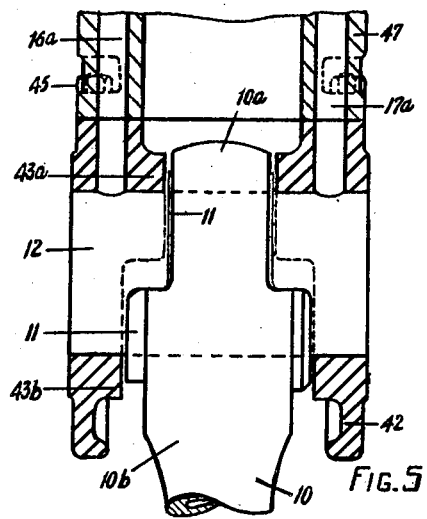
Figure 6:
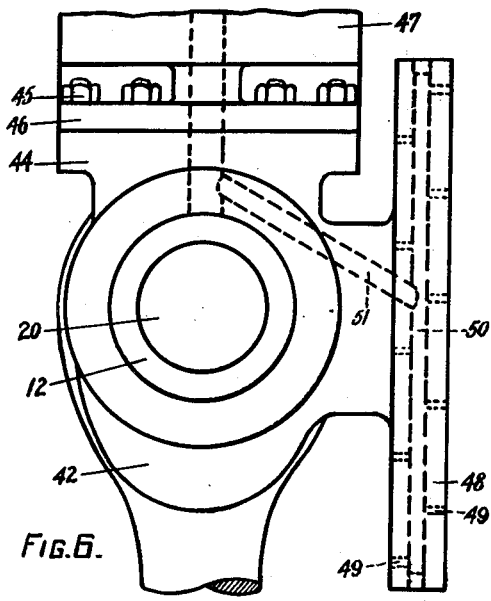

Figs. 5 and 6 are views at right angles to one another showing the invention applied to a sliding crosshead connecting a piston rod to a connecting rod. Fig. 5 shows the piston rod end in vertical section and Fig. 6 shows the parts in side view.

Referring firstly to Figs. 1 to 4, 7 designates a trunk piston provided in its upper part with a cooling space 8 and provided below the same with stepped gudgeon-pin bosses, the upper steps 9a being nearer together than the lower steps 9b, as clearly seen in Fig. 4, to accommodate the correspondingly stepped top end 10a, 10b of the connecting rod 10. The stepped top end of the connecting rod 10 is drilled to receive a similarly stepped bush or sleeve 11. The bush 11 and stepped gudgeon-pin bosses 9a, 9b, are drilled to receive a tubular gudgeon-pin 12. The bush 11 is fixed within the hole in the connecting rod top end and acts as a bearing sleeve for the top end of the connecting rod on the gudgeon-pin 12 during the angular movement of the connecting rod. The gudgeon-pin 12 is prevented from turning in the piston either by a key 13 or a stop screw 14 or by both means or their equivalent. Fig. 4 shows the gap 15 which allows for the angular movement of the connecting rod.

The wall of the cooling space 8 in the piston is provided with an inlet passage 16 and an outlet passage 17 for the piston cooling oil, these passages registering with holes 18 and 19 respectively in the tubular gudgeon-pin 12. Driven into the bore of the gudgeon-pin 12 is a distribution member 20 having both ends shaped as solid discs making an oil-tight fit in both ends of the hollow gudgeon-pin 12. The distribution member 20 has a part 20a of substantially smaller diameter than the bore of the gudgeon-pin; this part 20a has a hollow interior 21, which communicates by way of an inlet passage 22 with a radial hole 23 in the gudgeon-pin above the connecting rod. The space 21 also communicates through a passage 24 and through the hole 18 in the gudgeon-pin 12 with the passage 16 leading into the piston cooling space 8. The outlet passage 17 from the cooling space 8 communicates through the hole 19 in the gudgeon-pin with the space 25 between the gudgeon-pin and the reduced part 20a of the distributing member 20. A number of radial holes 26 in the lower part of the gudgeon-pin connect the space 25 with relatively deep oil grooves 27 in the bush 11. These oil grooves 27 have a capacity sufficient to pass not only the amount of oil necessary to lubricate and cool the gudgeon-pin, but in addition to pass the whole quantity of cooling oil from the piston space 8. To enable the oil grooves 27 to be made sufficiently deep, the bush 11 is externally eccentric with respect to the gudgeon-pin centre so that the thickness of the upper part of the bush is approximately the same as the thickness of metal of the bush beneath the grooves 27. The oil grooves 27 communicate through a number of holes 28 in the bush 11 with channels 29 in the bottom half of the bore in the top end of the connecting rod 10 and these channels 29 communicate by passages 30 in the connecting rod with a central longitudinal hole 31 therein.

The total amount of oil required for lubricating and cooling the gudgeon-pin and for cooling the piston passes up through a pipe 32 in the central hole 31 in the connecting rod and passes through a hole 33 in the bush 11 and through the hole 23 in the gudgeon pin into the space 21 as indicated by the arrow $t^1$. From thence the oil passes as shown by the arrows $t^2$ and $t^3$ into the piston cooling space 8, which it leaves by way of the outlet passage 17 as shown by the arrow $t^4$. The oil then passes as shown by the arrow $t^5$ into the space 25 between the gudgeon-pin 12 and the distributing member 20. The oil in the space 25 passes out through the holes 26 as shown by the arrows $t^6$ into the oil grooves 27 and then passes through the holes 28, channels 29 and passages 30 into and down the central hole 31 in the connecting rod.

The oil is supplied to an axial passage 34 in the crank pin 35 which has radial holes 36 leading to channels 37 in the divided bottom end bearing 38. From the channels 37 the oil passes up the central pipe 32 and from thence to the gudgeon-pin and piston as already described. The oil returning down the hole 31 in the connecting rod is discharged at the lower end of the connecting rod and into the crankcase either through a pipe 39 which is open at its lower end, as shown in the left-hand half of Fig. 2, or through passages 40 and 41 in the big end bearing 38 as shown in the right-hand half of Fig. 2, the passage 41 opening below into the crankcase.

As shown in Fig. 3, the oil grooves 27 are widened at each end at 27a so that during the angular movement of the connecting rod they will always be in communication with the holes 26 in the gudgeon-pin. For the same reason the central hole 33 is elongated. The position of the channels 29 in the connecting rod top end is shown dotted in Fig. 3.

Figs. 5 and 6 show a crosshead for a single-acting internal combustion engine with gudgeon-pin lubricating and provision for piston oil cooling similar to that shown in Figs. 1 to 4. The crosshead 42 has two bosses with steps 43a, 43b for the gudgeon-pin 12 and the top end of the connecting rod 10 is stepped and fitted with a stepped bush 11 exactly as previously described with reference to Figs. 1–4. The top of the cross-head 42 has a flange 44 connected by bolts 45 or other fastening means to a flange 46 on the lower end of the piston rod 47, which is provided with oil inlet and return passages 16a and 17a leading to the piston cooling space (not shown). The oil passes to the inlet passage 16a from a central pipe in the connecting rod through the bush 11, gudgeon-pin 12 and inner distributing member 20 and returns from the return passage 17a to a bore in the connecting rod through the bush, gudgeon-pin and distributing member exactly as described with reference to Figs. 1–4. The crosshead 42 has the usual shoe 48 and lubricating oil is supplied to the front and back sliding surfaces of the shoe 48 through holes 49 communicating with inner oil passages 50 supplied with oil by a passage 51 leading from the lower end of either the oil inlet passage 16a or the return passage 17a.

We claim:

1. In a cooling system for pistons, the combination of a piston having a cooling space and a connecting rod having two separate passages for admission and returning of cooling oil respectively, a pin connecting said piston and said connecting rod and being hollow and fitted internally with an oil distributing member, said member dividing the interior of the pin into an inner and an outer space, one space being for the passage of oil from the connecting rod to the cooling space of the piston and another space for the returning of the oil from the cooling space to the connecting rod.

2. A lubricating and cooling system according to claim 1, in which the pin has the shape of an open-ended tube and the oil distributing member comprises solid end discs closing the ends of said tube and united to a reduced hollow portion which separates oil flowing to the cooling space through said hollow portion from oil flowing around said hollow portion in returning from the piston cooling space to the connecting rod.

3. A lubricating and cooling system according to claim 1, in which the one of the two spaces in the pin is connected with the corresponding passage in the connecting rod by means of holes in the wall of the pin, said holes opening into high capacity oil grooves between the pin wall and a bearing bush of the pin, said oil grooves communicating with the said passage in the connecting rod so that the whole stream of oil passing through the pin for cooling the piston also passes through said lubricating oil grooves.

4. A lubricating and cooling arrangement according to claim 1 in which an eccentric bush is provided for the pin to provide sufficient thickness for lubricating grooves in the lower part thereof.

5. In a cooling arrangement for a piston, a connecting rod having two separate passages for oil therein and a bearing, a hollow pin associated with said bearing and having an opening therein for communicating the interior of the pin with one of said passages, distributing means for conducting and directing oil entering the pin through said opening towards a cooling space in the piston, said distributing means having a space for receiving the cooling oil returning from the cooling space in the piston, and means associated with the space of said distributing means for conducting the returning oil to the other passage of said connecting rod.

HANS HENRIK BLACHE.
FREDERICK ERNEST REBBECK.